March 27, 1962 J. C. EVANS ETAL 3,026,714
MEASUREMENT OF LINEAR DIMENSIONS
Filed April 22, 1957 5 Sheets-Sheet 4
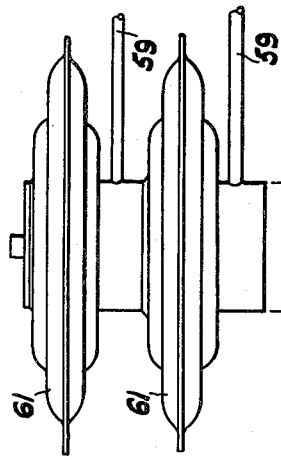
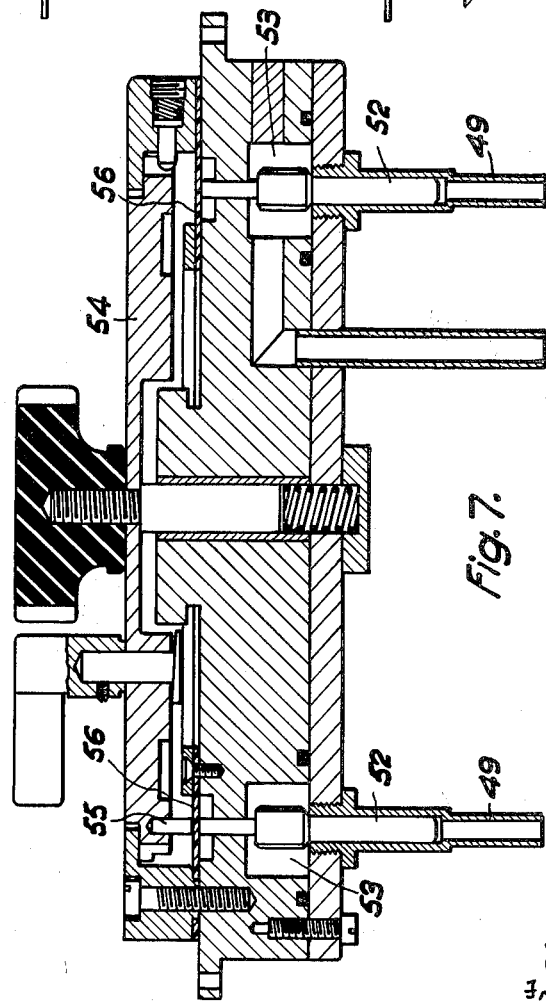
Inventors:
James C. Evans
Ivor G. Morgan
Leonard W. Nichols
Arthur J. Barratt
Frederick C. P. Mason
William F. Atkins
By: Stevens, Davis, Miller & Mosher
Attorneys United States Patent Office 3,026,714
Patented Mar. 27, 1962

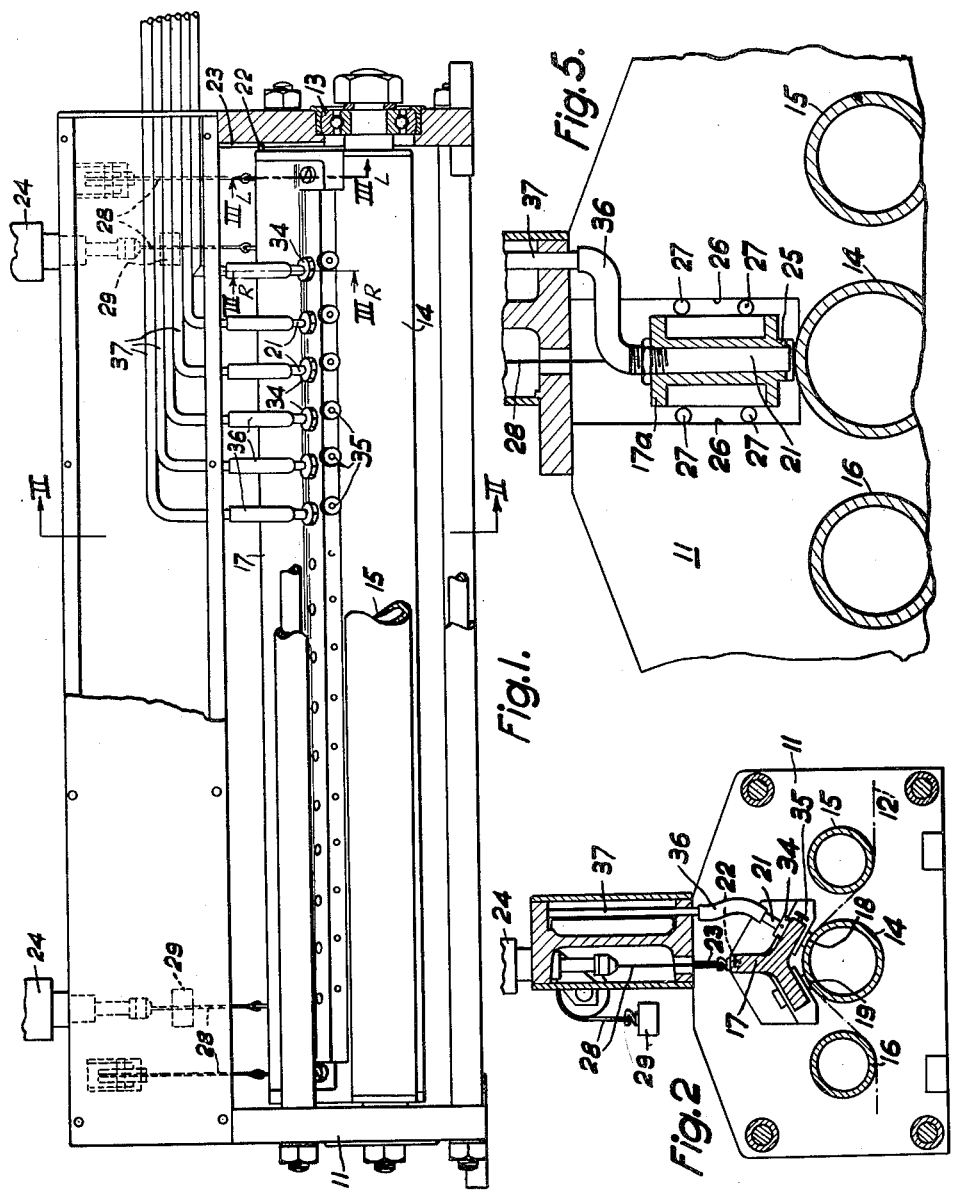

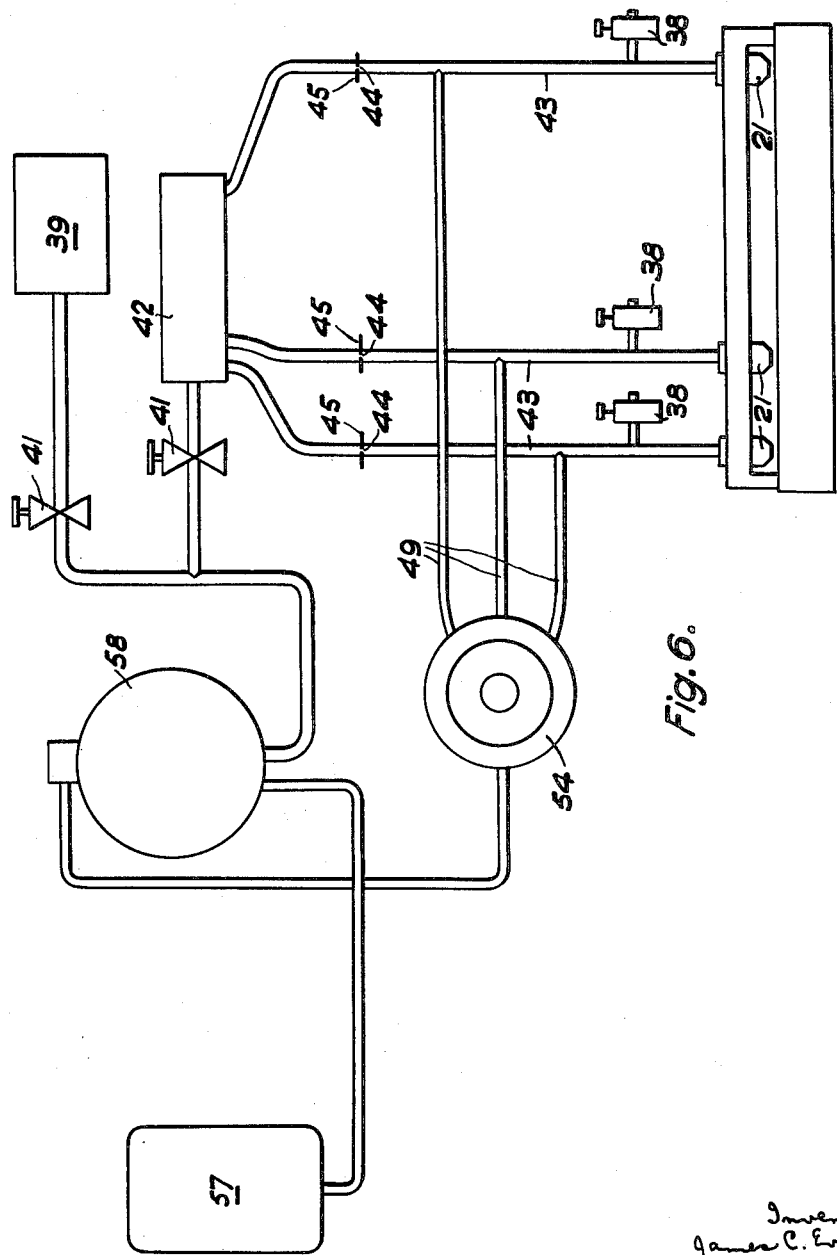

3,026,714
MEASUREMENT OF LINEAR DIMENSIONS
James Charles Evans, Hampton, Ivor Geraint Morgan, Teddington, Leonard Wilfred Nickols, Hampton Hill, Arthur John Garratt, Esher, Frederick Charles Peter Mason, Feltham, and William Frederick Atkins, Twickenham, England, assignors to National Research Development Corporation, London, England, a British corporation
Filed Apr. 22, 1957, Ser. No. 654,297
Claims priority, application Great Britain Apr. 25, 1956
8 Claims. (Cl. 73—37.7)

This invention relates to the measurement of the thickness of sheet material such as cellulose acetate and other so-called plastics and metal foils. An object of the invention is to enable the thickness of such material to be measured whilst the material is in motion, so that it can be measured, for example, during the manufacturing process.

It is an object of the invention that materials as thin as one thousandth of an inch shall be measured to an accuracy of the order of 1 percent, since for many purposes this high precision is required. The method of measurement used is therefore based on "fluid" gauging which is itself capable of the required accuracy. According to this method, a fluid medium, generally air, from a closely maintained constant pressure source is admitted through a suitable constriction to a measuring head, its escape from the measuring head being controlled by the dimension to be measured, and the measurement being effected by measuring the pressure between the constriction and the measuring head. This pressure may be exhibited directly on a pressure controlled indicator or recorder or it may first be amplified by a pneumatic amplifier and then so exhibited. The indicator or recorder can be graduated or scaled so as to read directly in units of thickness.

In applying this method to the measurement of the thickness of a material, the measuring head is designed to provide an invariable gap either between two nozzles directed towards each other or between one nozzle and a datum surface, the material being introduced into this gap. The latter arrangement is the preferred one and since it is usually undesirable to carry a moving sheet of thin material over a fixed anvil, the datum surface preferably takes the form of a roller. When accuracies of the kind here contemplated are necessary, this immediately introduces difficulties due to possible errors of figure of the roller, and still more important, eccentricity of the roller in its mounting.

To reduce errors due to eccentricity in the mounting, according to the invention, the nozzle is carried by a support which itself takes a direct bearing on the periphery of the roller over which the sheet material passes, the nozzle being arranged in substantially the same axial plane as the region of contact between the support and the roller. Conveniently, the support takes two bearings on the roller, one at each end and in the same axial plane, and the length of the roller is chosen so that the sheet lies satisfactorily between the bearings. By these means the effects of eccentricity of the roller in its mounting are substantially eliminated.

It is usually desirable to measure the thickness at a number of points distributed across the width of the material in addition to measurements along the length. For this purpose any desired number of nozzles at any desired spacing can be carried by the support, the distances of the nozzles from the roller being adjusted with the roller running, but without material on it, so that each gives the same fiducial reading. In this way the effects of, for example, variation of diameter of the roller along its length are to a great extent eliminated. It will be appreciated that from the method of manufacture by grinding, the likely errors of figure of a roller will be symmetrical in relation to the axis of the roller and an important aim of the invention is to eliminate the effects of such errors.

The features of the invention so far enunciated will enable variations in thickness of the material to be measured. In order to obtain the absolute magnitude of the thickness, it is arranged that the distance of the nozzle support from the roller can be varied by means of precision packing pieces, one for each bearing. In this way, with datum packing pieces in position, the nozzles are adjusted with the roller running, but without material on it, until all give the same fiducial reading. The packing pieces are then changed for others whose size exceeds that of the first by the nominal thickness of the material to be measured. When the material is then in position on the roller, and provided the thickness of the material is uniform and of nominal value, the indicator or recorder readings corresponding to the different nozzles will be identical and the same as the chosen fiducial reading. Any difference in thickness will be exhibited on the indicator or recorder and thus measured. Magnifications up to 50,000 are readily obtained.

If, whilst the material is moving, it is required to obtain continuous records of the thickness at a number of points across the width, each nozzle can be separately connected to independent measuring or recording pneumatic systems. For many purposes a continuous indication or record at one station, with provision for selecting any station across the sheet at will, may be sufficient. To meet this requirement the invention provides a selector valve between the nozzles and the display unit.

It may be desired to indicate or record the mean value for the sheet. For this purpose, the individual nozzle circuits can be directly connected to a common indicator or recorder, in which case the reading will be proportional to the mean thickness. If, however, it is desired to retain the possibility of separate indication of thickness at the individual nozzle stations, then a pressure responsive capsule may be connected in each circuit and the capsules be linked mechanically, e.g. placed in direct contact with one another, so that a displacement signal is derived which is proportional to the sum (and thus to the mean value) of the pressures in the individual nozzle circuits. This signal is arranged to actuate an indicator or recorder.

The invention will be further described with reference to the accompanying drawings, which illustrate an example embodying a preferred construction and some possible modifications.

FIGURE 1 is a front elevation of the apparatus with parts broken away and in section.

FIGURE 2 is an end view in section on the line II—II of FIGURE 1.

Figure 3:
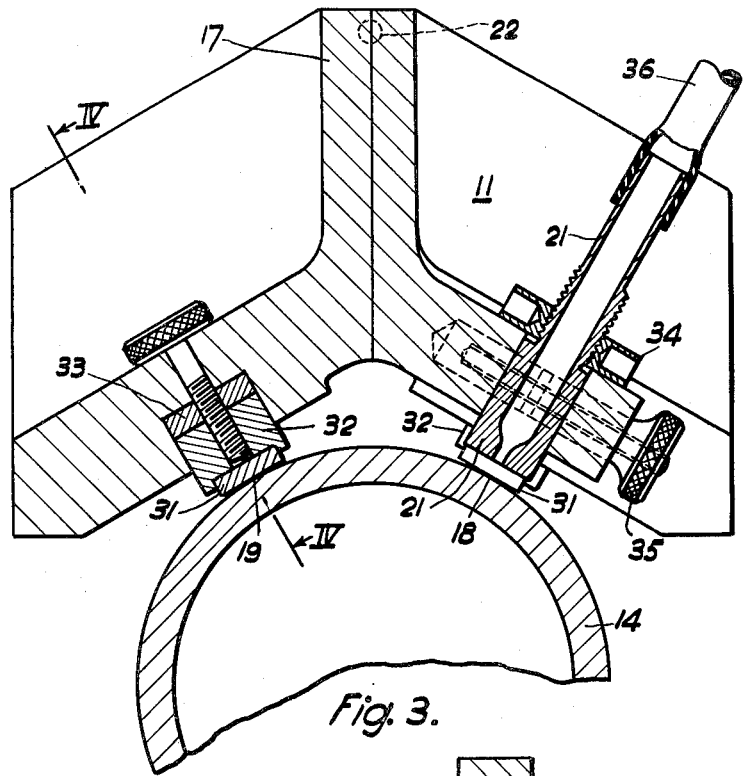

The right hand side of FIGURE 3 is a detail section on the line III$_R$—III$_R$ of FIGURE 1 and the left hand side of FIGURE 3 is a detail section on the line III$_L$—III$_L$.

Figure 4:
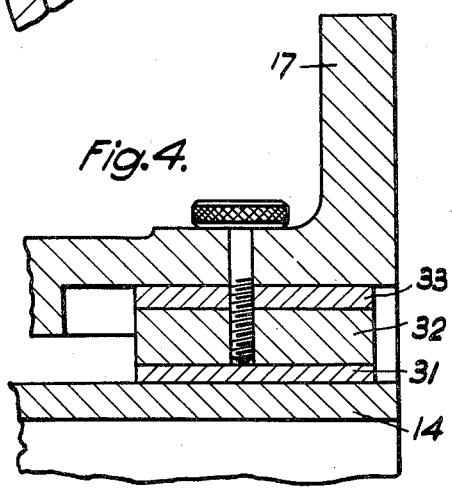

FIGURE 4 is a section on the line IV—IV of FIGURE 3.

FIGURE 5 is a detail of an alternative construction, also on an enlarged scale.

FIGURE 6 is a diagram showing the pneumatic connections and indicating or recording system.

FIGURE 7 is an axial section of the selector valve used in FIGURE 6.

Figure 8:
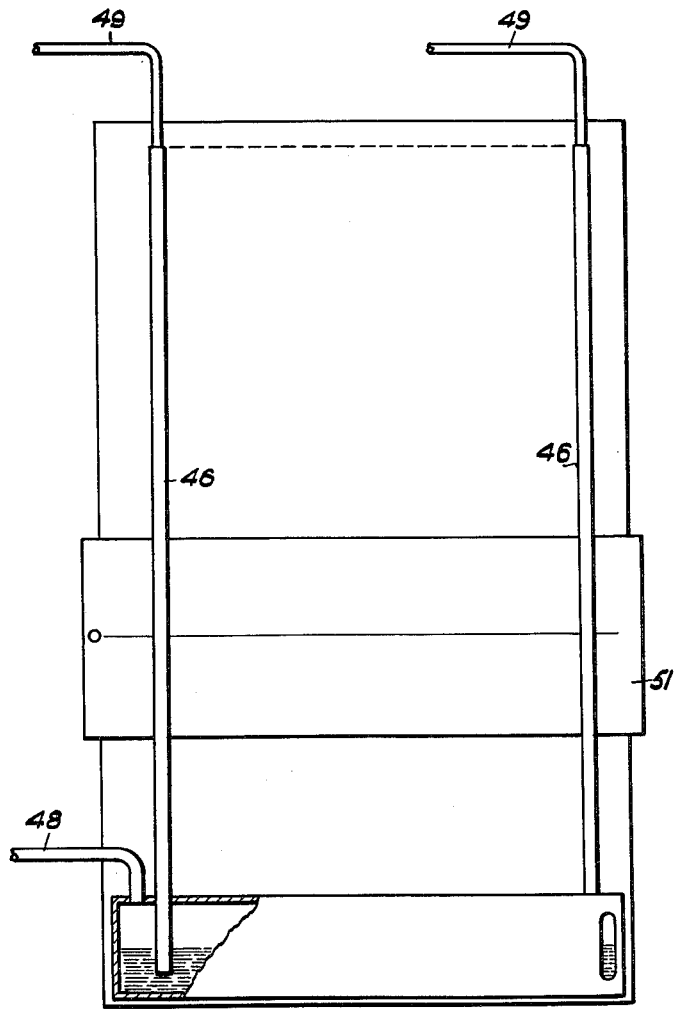

FIGURE 8 is a diagram of part of an alternative indicating system, and

FIGURE 9 is a diagram of part of another alternative indicating system.

The apparatus illustrated in FIGURES 1 to 4, 6 and 7 includes a supporting framework 11 in which a measuring roller 14 which may, for example, be of stainless steel, is mounted in commercially obtainable ball-bearings 13 which are preferably, as shown, self-aligning, to minimise frictional torque. Since the roller is to be rotated by the material 12 being measured, to provide a suitable angle of lap, the material is guided under two auxiliary rollers 15, 16, mounted in ordinary commercial ball-bearings and placed one on each side of the roller 14. The material 12 may be drawn through the apparatus by any suitable means, not shown, for example a device for coiling the material as it comes from a machine in which its manufacture has been carried up to the stage at which it is being gauged.

An axial support 17 in the form of a beam of inverted Y section at each end directly contacts the roller 14 beyond the part over which the material being measured passes, at two circumferentially spaced regions 18, 19, the measuring nozzles 21 being fixed to the beam so that they are distributed over the part of the roller over which the material passes and are situated in a plane passing through the axis of the roller 14 and the region 18. This arrangement ensures that the nozzles are always in a plane which passes through the axis of the roller and rotation about the axis is prevented by pins 22 projecting from the ends of the support into grooves 23 in the framework. It also ensures that the position of the beam and nozzles is determined from the actual surface of the roller in the plane in which measurement is effected independently of any eccentricity or want of circularity on the roller. Still further this arrangement using two circumferentially spaced regions of contact at both ends avoids the need for any circumferential restraint apart from that afforded by the suspension cables described below. Air cylinders 24 may be provided for lifting the support to allow threading of the material through the apparatus. The use of circumferentially spaced contact regions 18, 19 introduces a slight secondary error but this error will be completely negligible for a roller of a quality which could be expected from a reasonable standard of manufacture.

Alternatively to the inverted Y section support 17, as shown in FIGURE 5, a nozzle support in the form of a metal beam 17a of I section may be used, with end pieces 25 which contact the ends of the roller 14 and work in vertical slideways 26 which permit the beam to move freely in a vertical direction but prevent its rotation. Friction in the slideways may be kept to a minimum, for example, by the use of side-acting roller bearings 27.

Whatever form it takes, the nozzle support is suspended above the roller 14 by cables 28 which carry counterbalance weights 29 at their other ends, to reduce the bearing forces at the contact regions, being adjusted to provide a minimum bearing force consistent with obtaining positive contact. It is also desirable, in order to reduce friction and wear at the contact regions, to introduce pads 31 of a bearing material of low coefficient of friction. Excellent results have been obtained by using pads made from porous bronze impregnated on the bearing face with polytetrafluorethylene. The pads may be secured to metal blocks 32 by means of a cement such as an epoxy resin and the blocks be secured to the end pieces 25 or to the limbs of the metal Y section nozzle support 17 by means of screws. Precision packing pieces 33 controlling the distance of the support from the axis of the roller are placed between the metal blocks 32 and machined pads on the end pieces 25 or the limbs of the support 17, and these pieces 33 are slotted so that with the securing screws slackened they may be withdrawn endwise.

The nozzles 21 are directed as nearly as may be radially to the roller 14. For initial adjustment of its distance from the roller, each has a threaded portion on which screws a nut 34 bearing against a surface on the support and a tangent screw 35 is provided for locking the nozzle. Each nozzle is connected by a flexible tube 36 to a metal tube 37 fixed to the main framework 11, each metal tube 37 leading away to the remainder of the pneumatic apparatus. The adjustment of the nozzles is facilitated by providing in parallel with each a minute leak, which preferably takes the form of a needle valve 38 having a long taper needle. By turning the valve 38, when the nozzle has been approximately located and locked, the final adjustment of the pressure to its fiducial value may be smoothly made.

The air for the apparatus may be taken from a factory supply or from a compressor indicated at 39 installed for the purpose. It should be cleaned and reasonably dried in the normal manner before being fed to a commercially obtainable pressure regulator, indicated at 41, set to give the required constant pressure. The air may then pass to a manifold 42 whence it is fed through suitable constrictions and pipes 43 to the nozzles 21 (and the parallel leaks 38). Each constriction may conveniently take the form of a hole 44 in a small thin brass plate 45 and it is desirable that all the constrictions should be sufficiently identical in size and form to have closely the same pneumatic characteristic.

As a specific example of the invention, it may be mentioned that for the measurement of foils made of cellulose derivative, satisfactory results have been obtained with an apparatus having a stainless steel roller of 2½ inches (63.5 mm.) diameter, the material running at a speed of 20 feet (6 metres) per minute, and the contact angle determined by the rollers 15, 16 being about 180. The nozzle support 17 of the inverted Y section above described was used, and carried 16 nozzles spaced uniformly across the 24 inch (60 cm.) width of the foil.

If simultaneous indication or recording for each nozzle station is required, the arrangement illustrated in FIGURE 8 may be used. Here a transparent manometer tube 46, e.g. of glass, is provided for each nozzle station, all the tubes having their lower ends immersed in a common liquid reservoir. A constant pressure is applied to the liquid surface through a pipe 48, thus forcing the liquid upward in all the tubes 46. This constant pressure may conveniently be the same constant pressure which is supplied to the constrictions 44 i.e. that supplied by the regulator 41, and the liquid used may be water or a coloured aqueous solution. To the upper ends of the tubes 46 are connected pipes 49 branched off from the pipes 43 so that the liquid level in each tube 46 is depressed by an amount proportional to the pressure between the corresponding constriction 44 and nozzle 21. The level in each tube is thus a measure of the thickness at the point corresponding to the position of the nozzle 21 with which the respective tube 46 is associated and a simultaneous indication of the thickness at the nozzle station is provided by the aid of a scale 51. If desired, the indication may be recorded photographically.

FIGURE 7 shows the construction of a selector which may be used in cases where it suffices to obtain a continuous indication or record at one station, with provision for selecting any station across the sheet 12 at will. This selector employes a number of spring operated value units 52, such as the well known Schräder type. One valve unit 52 is associated with each measuring circuit, one side of the valve 52 being connected through the pipe 49 branched off from the pipe 43 joining the constriction to the nozzle, whilst the other side is connected to a chamber 53 common to all the valves. The valve units are arranged in a circle below a disc 54 which has on its underside a suitable protuberance 55 so that by turning the disc and then depressing it any one of the valves may be opened in turn. Between the disc 54 and the heads of the valves 52 is inserted a sheet 56 of flexible material to seal the common chamber 53; this sheet 56 may, for example, be of neoprene. The common chamber 53 is connected directly to a pressure controlled indicator or recorder 57 or to an intermediate pneumatic amplifier 58 the output from which actuates the indicator or recorder 57. Thus when one of the valves 52 is opened the pressure in the circuit to which it is connected is communicated to the common chamber 53 and thence directly or indirectly to the indicator or recorder 57. If desired a simple constriction may be introduced between the common chamber 53 and the indicator recorder 57 or the amplifier 58 to provide damping.

In some cases the mean value of the thicknesses at all nozzle stations may be required. If this is the only measurement required, it suffices to connect all the pipes 49 to a common chamber which is connected directly or through an amplifier to an indicator or recorder. If, however, the possibility of simultaneous indication or recording for each station must be maintained, with the possibility of obtaining a mean value, the arrangement of FIGURE 9 may be used. Here a pipe 59 associated with each nozzle and branched off from the respective pipe 49 or 43 leads to a pressure responsive capsule 61. The capsules are linked mechanically, conveniently being mounted in direct contact with one another. Each capsule deflects by an amount proportional to the pressure applied to it, which corresponds to the thickness at the respective nozzle station and the over-all length of the column of capsules is thus proportional to the sum and therefore to the mean value of the pressures in the individual nozzle circuits. The changes in length are readily applied to any convenient form of indicator or recorder, either directly or through a pneumatic amplifier. It will be understood that the capsules should have a linear relationship between pressure and deflection and that the pipes 59 should be sufficiently flexible to avoid undue strain on the capsules.

It will be noted that the possibility of providing a pneumatic amplifier has been mentioned in connection with the arrangements illustrated in FIGURES 6 to 9. If a suitable pneumatic amplifier is included, changes in thickness of the material are converted into proportional signals at power level, i.e. several pounds per square inch (e.g. from say 1/5 to 4/5 atmosphere). Where circumstances make it desirable these signals could be used for controlling a manufacturing operation. For example, in the rolling of metal foil, if the thickness is greater or less than required, the signal could be used to adjust the spacing of the rollers of the mill.

While reference has been made above in the description of the apparatus illustrated only to pneumatic gauging, the same method of gauging can be carried out using a liquid instead of a gaseous medium in the measuring nozzles.

We claim:

1. Apparatus for the measurement of the thickness of thin sheet material while it is in motion by pneumatic gauging effected by the aid of a fluid discharge nozzle through which a fluid medium employed in gauging is discharged under the control of the sheet material comprising a roller over which the material passes, a beam of inverted Y section, two bearing surfaces at each end of said beam on the underside of the limbs of the Y contacting the roller at circumferentially spaced regions whereby the beam takes a direct sliding bearing on the periphery of the roller clear of the material, the bearing surfaces at one end corresponding with those at the other so that the regions of contact define two lines parallel with the axis of the roller, and at least one said fluid discharge nozzle carried by said beam substantially in one of the axial planes defined by said two lines.

2. Apparatus according to claim 1 also comprising cables and counterbalance weights whereby the nozzle support beam is suspended above the roller.

3. Apparatus as set forth in claim 1 comprising a plurality of fluid discharge nozzles carried by said beam all in the same axial plane and spaced apart at a number of points distributed along the beam, the nozzles being located at such distances from the roller that with the roller rotating but without material on it, each gives the same fiducial reading when gauging is effected.

4. Apparatus as set forth in claim 1 also comprising two pads secured to each end of said beam on the underside of the limbs of the Y, said pads being of porous bronze, and polytetrafluorethylene impregnating the underface of each pad, said underface forming the bearing surfaces which contact the roller.

5. Apparatus as set forth in claim 1 also comprising two exchangeable packing pieces secured to each end of said beam on the underside of the limbs of the Y, and a bearing pad secured on the underside of each packing piece, the under-surface of each of said pads constituting one of the bearing surfaces which contact the roller.

6. Apparatus for the measurement by pneumatic gauging of the thickness of a thin sheet material at a plurality of points distributed over the width of the material while it is in motion over a roller, comprising a support taking a direct sliding bearing on the periphery of the roller at two positions in the same axial plane and on either side of the sheet material, exchangeable packing pieces between the support and the actual surfaces which take a bearing on the periphery of the roller, a plurality of nozzles for the discharge of the fluid used in gauging, said nozzles being carried by said support spaced along it in said axial plane and directed towards the roller, the distance of the nozzles from the roller being adjusted so that with one set of packing pieces in position and with the roller running without the material on it, each nozzle gives the same fiducial reading in the associated gauging equipment, the apparatus also including other interchangeable packing pieces which exceed the thickness of those of said one set by the nominal thickness of the material to be measured.

7. Apparatus for the measurement by pneumatic gauging of the thickness of a thin sheet material at a plurality of points distributed over the width of the material while it is in motion over a roller, comprising a support taking a direct sliding bearing on the periphery of the roller at two positions in the same axial plane on either side of the sheet material, a plurality of nozzles for the discharge of fluid used in gauging, said nozzles being carried by said support spaced apart along it in said axial plane and directed towards the roller, a plurality of transparent manometer tubes one for each nozzle, a separate connection from the top of each tube to the respective nozzle, a reservoir for manometer liquid with the lower ends of all the manometer tubes immersed therein, and a connection for supplying the reservoir with manometer liquid under constant pressure.

8. Apparatus for the measurement by pneumatic gauging of the thickness of thin sheet material while it is passing over a roller comprising a nozzle for the discharge of the fluid used in gauging towards the roller, a support for said nozzle of greater length than the width of the material to be gauged, a bearing pad at each end of said support made of porous bronze and polytetrafluorethylene impregnating the outer face of each pad, the outer faces of said pads taking a direct sliding bearing on the periphery of the roller on either side of the material and on a substantially axial line in substantially the same axial plane as the nozzle.

References Cited in the file of this patent

UNITED STATES PATENTS

| 1,692,243 | Beckmann et al. | Nov. 20, 1928 |
| 1,946,924 | Allen et al. | Feb. 13, 1934 |
| 2,051,258 | Hunt | Aug. 18, 1936 |
| 2,438,696 | Fox et al. | Mar. 30, 1948 |
| 2,728,223 | Herrman | Dec. 27, 1955 |

FOREIGN PATENTS

| 670,976 | Great Britain | Apr. 30, 1952 |